(12) United States Patent
Ito et al.

(10) Patent No.: US 8,873,221 B2
(45) Date of Patent: Oct. 28, 2014

(54) SOLID ELECTROLYTIC CAPACITOR

(75) Inventors: Tadahito Ito, Osaka (JP); Yutaka Taketani, Osaka (JP); Yoshiaki Hasaba, Osaka (JP); Makoto Sakamaki, Osaka (JP)

(73) Assignee: SUN Electronic Industries Corp., Osaka (JP)

( * ) Notice: Subject to any disclaimer, the term of this patent is extended or adjusted under 35 U.S.C. 154(b) by 75 days.

(21) Appl. No.: 13/541,856

(22) Filed: Jul. 5, 2012

(65) Prior Publication Data

US 2013/0016453 A1    Jan. 17, 2013

(30) Foreign Application Priority Data

Jul. 13, 2011 (JP) ................................. 2011-154871

(51) Int. Cl.
*H01G 9/15* (2006.01)
*H01G 9/042* (2006.01)
*H01G 9/00* (2006.01)
*H01G 9/04* (2006.01)

(52) U.S. Cl.
CPC ................. *H01G 9/042* (2013.01); *H01G 9/15* (2013.01); *H01G 2009/0014* (2013.01); *H01G 2009/0404* (2013.01)
USPC ....................................................... 361/528

(58) Field of Classification Search
USPC ................................................... 361/528, 532
See application file for complete search history.

(56) References Cited

U.S. PATENT DOCUMENTS

| | | | |
|---|---|---|---|
| 3,824,127 A * | 7/1974 | Conwicke ...................... 428/434 |
| 7,697,266 B2 * | 4/2010 | Ogiwara ........................ 361/523 |
| 2007/0081300 A1 * | 4/2007 | Kobayashi et al. ........... 361/523 |
| 2009/0195968 A1 * | 8/2009 | Naito ............................. 361/525 |
| 2009/0231782 A1 * | 9/2009 | Fujita et al. ................... 361/525 |
| 2011/0267741 A1 | 11/2011 | Naito |

FOREIGN PATENT DOCUMENTS

JP     2011-003909    1/2011

* cited by examiner

*Primary Examiner* — Jenny L Wagner
*Assistant Examiner* — Michael P McFadden
(74) *Attorney, Agent, or Firm* — Morgan, Lewis & Bockius LLP

(57) ABSTRACT

Provided is a solid electrolytic capacitor having reduced manufacturing man-hour, low leak current, low initial ESR, low ESR after long year use, and long life. The solid electrolytic capacitor includes a anode member made of a valve action metal, a dielectric coating layer formed on a surface of the anode member, a solid electrolytic layer formed on the dielectric coating layer, and a conductive solid layer covering the solid electrolytic layer, in which the conductive solid layer contains silver and nickel, and the weight ratio of nickel to silver is set to 3 to 30%.

16 Claims, 2 Drawing Sheets

SOLID ELECTROLYTIC CAPACITOR

This application is based on Japanese Patent Application No. 2011-154871 filed on Jul. 13, 2011, the contents of which are hereby incorporated by reference.

BACKGROUND OF THE INVENTION

1. Field of the Invention

The present invention relates to a solid electrolytic capacitor having a negative electrode containing silver.

2. Description of Related Art

As electronic devices have been digitized, solid electrolytic capacitors used in electronic devices are required to have a low equivalent series resistance (ESR). In addition, as electronic devices are used for a long term, solid electrolytic capacitors having a small characteristic variation due to long year use are required so as to avoid breakdown or malfunction of the electronic device.

An example of a conventional solid electrolytic capacitor is disclosed in Patent Document 1. This solid electrolytic capacitor includes a capacitor element in which a dielectric coating layer, a solid electrolytic layer, and a conductive solid layer are formed on an anode member. The anode member is made of valve action metal such as tantalum or niobium. The dielectric coating layer is formed on a surface of the anode by anodic oxidation.

The solid electrolytic layer is made of conductive polymer such as polypyrrole, polythiophene, polyaniline, or the like, and sulfonic acid compound or the like is used as a dopant. The conductive solid layer covers the solid electrolytic layer and is formed by applying conductive resin paste and curing the same. The conductive resin paste contains binder resin and silver powder. Because silver has small specific resistance, a solid electrolytic capacitor having small ESR can be obtained, but it is expensive as rare metal.

When the solid electrolytic capacitor is mounted on a substrate by reflow or after long year use thereof in a state mounted in an electronic device, the specific resistance of the conductive solid layer increases so that the ESR increases. The increase of the specific resistance of the conductive solid layer is caused mainly when silver is sulfurated by sulfur compound in the capacitor element. There is a case where the sulfur compound exists in the air as a gas component and is absorbed in the capacitor element or a case where the conductive polymer forming the solid electrolytic layer contains the sulfur compound as impurity.

Therefore, the solid electrolytic capacitor is placed under a reduced pressure and left for 30 minutes to 10 hours at a temperature of 190 to 220 degrees Celsius as heat treatment so that sulfur element content in the conductive solid layer containing silver is 0.8 weight percent or lower. Thus, it is possible to suppress the increase of ESR due to the reflow.

[Patent Document 1] JP-A-2011-003909 (pp. 6-14, FIG. 1)

However, the above-mentioned conventional solid electrolytic capacitor has a problem that manufacturing man-hour increases because it is necessary to perform the heat treatment for reducing the sulfur element content. In addition, because it is left for long hours at a temperature of 190 degrees Celsius or higher, the dielectric coating may be damaged. Therefore, there is possibility of an increase of leakage current (LC) or an increase of initial ESR because the dopant is eliminated from the conductive polymer. In addition, there is also a problem that the sulfur compound remaining in the capacitor element migrates gradually to the conductive solid layer containing silver by long year use, and hence the ESR changes largely so that life of the solid electrolytic capacitor is shortened.

In addition, a solid electrolytic capacitor including solid electrolyte made of manganese dioxide also has the same problem. The sulfur compound existing in the air is absorbed in the capacitor element. As a result, the sulfur compound remaining in the capacitor element gradually migrates to the conductive solid layer containing silver by long year use, and hence the ESR changes largely so that life of the solid electrolytic capacitor is shortened.

SUMMARY OF THE INVENTION

It is an object of the present invention to provide a solid electrolytic capacitor capable of reducing manufacturing man-hour, having a small leakage current, low initial ESR and low ESR after long year use so that long life can be achieved.

In order to achieve the above-mentioned object, the invention described in claim 1 provides a solid electrolytic capacitor including an anode member made of a valve action metal, a dielectric coating layer formed on a surface of the anode member, a solid electrolytic layer formed on the dielectric coating layer, and a conductive solid layer covering the solid electrolytic layer, in which the conductive solid layer contains silver and nickel, and the weight ratio of nickel to silver is set to 3 to 30%.

With this structure, the dielectric coating layer such as oxidation coating or the like is formed on a surface of the anode member made of metal having valve action such as niobium, tantalum or the like, and the solid electrolytic layer such as conductive polymer or the like is formed on a surface of the dielectric coating layer. In addition, the conductive solid layer containing silver and nickel is formed on the solid electrolytic layer so as to be conductive, and hence the cathode of the solid electrolytic capacitor is formed. The weight ratio of nickel to silver in the conductive solid layer is set to 3 to 30%.

In addition, according to the invention described in claim 2, the weight ratio of nickel to silver in the conductive solid layer is set to 15% or higher in the solid electrolytic capacitor having the above-mentioned structure.

In addition, according to the invention described in claim 3, the solid electrolytic layer contains sulfur element in the solid electrolytic capacitor having the above-mentioned structure.

In addition, according to the invention described in claim 4, the solid electrolytic layer is made of conductive polymer, and dopant contained in the conductive polymer is compound containing sulfur element in the solid electrolytic capacitor having the above-mentioned structure.

In addition, according to the invention described in claim 5, the conductive polymer contains polythiophene or a derivative thereof in the solid electrolytic capacitor having the above-mentioned structure.

In addition, according to the invention described in claims 6 and 7, a carbon layer is disposed between the solid electrolytic layer and the conductive solid layer in the solid electrolytic capacitor having the above-mentioned structure.

According to the present invention, because the weight ratio of nickel to silver contained in the conductive solid layer is set to 3 to 30%, sulfuration of silver in the conductive solid layer generated in reflow or after long year use can be suppressed, and hence an increase of ESR can be suppressed. In addition, because heat treatment for eliminating the sulfur element component is not necessary, manufacturing man-hour can be reduced, and leakage current as well as an increase of initial ESR can be prevented. In addition, a using amount of silver as expensive precious metal can be reduced, and hence cost of the solid electrolytic capacitor can be reduced.

DETAILED DESCRIPTION OF THE PREFERRED EMBODIMENTS

Figure 1:
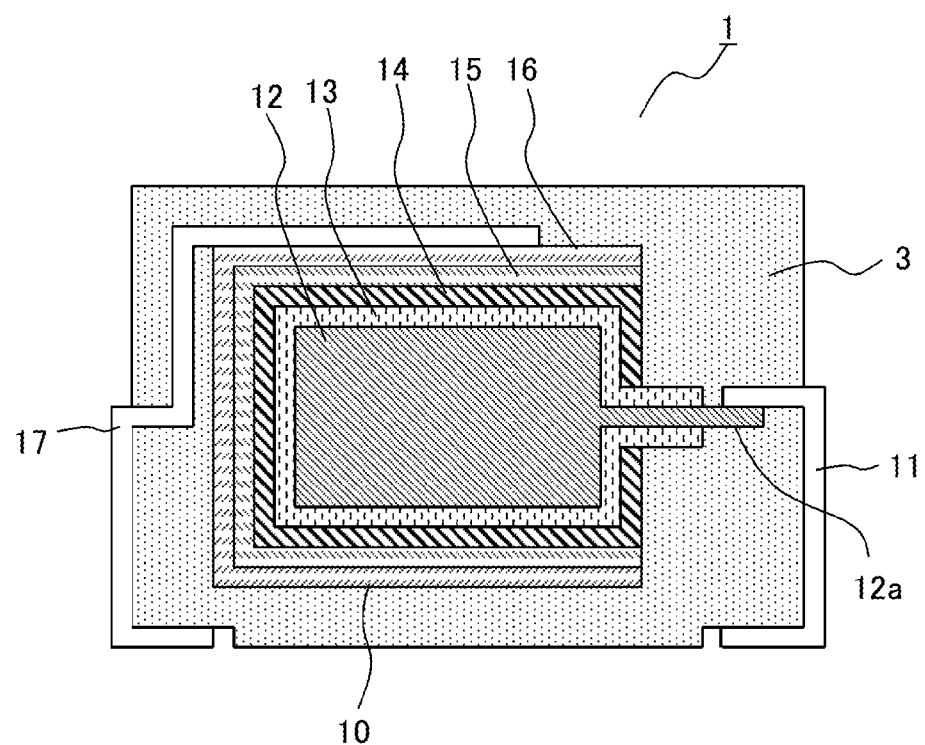
FIG. 1 is a cross sectional side view illustrating a solid electrolytic capacitor of an embodiment of the present invention.

Hereinafter, an embodiment of the present invention will be described with reference to the attached drawings. FIG. 1 is a cross sectional side view of a solid electrolytic capacitor of an embodiment. The solid electrolytic capacitor 1 includes a capacitor element 10 covered with an outer sheath 3. The capacitor element 10 is formed by laminating a dielectric coating layer 13, a solid electrolytic layer 14, a carbon layer 15, and a conductive solid layer 16 on a surface of a anode member 12.

The anode member 12 is manufactured by forming fine powder of valve action metal such as tantalum, niobium or the like into predetermined dimensions and sintering at high temperature in a vacuum to be a porous member. In this case, an embedded lead wire 12a is disposed in one end of the anode member 12. The embedded lead wire 12a is usually formed of the same material as the positive electrode member 12. It is possible to electrically weld the embedded lead wire 12a to the end surface of the anode member 12 after sintering.

The dielectric coating layer 13 is made of oxide coating formed by chemical conversion of the anode member 12 and is formed on the entire surface and inside of the porous anode member 12.

The solid electrolytic layer 14 is made of conductive polymer or manganese dioxide and is formed on the surface of the dielectric coating layer 13 and inside the porous member. The conductive polymer is formed by polymerization of polymerizable monomer containing dopant. As the polymerizable monomer, there are used pyrrole, thiophene, aniline, or a derivative of them. The 3,4-ethylenedioxythiophene as a derivative of thiophene is preferable from viewpoint of conductivity and stability. As the dopant, it is preferred to use sulfonic acid compound or carboxylic acid compound. Thus, the conductive polymer is formed of polypyrrole, polythiophene, polyaniline, or the like.

The thiophene or a derivative thereof has sulfur atoms in the molecule, and sulfonic acid compound also has sulfur atoms in the molecule. Therefore, the conductive polymer such as polythiophene or the like may also contain sulfur compound having sulfur atoms in the molecule as impurity. It is difficult to remove the impurity containing the sulfur compound from the conductive polymer to be the solid electrolytic layer 14 even if a cleaning process is performed after polymerization.

The carbon layer 15 is formed by dipping the capacitor element 10 in carbon suspension and drying the same so that the surface of the solid electrolytic layer 14 is covered with carbon.

The conductive solid layer 16 is formed by applying conductive resin paste onto the carbon layer 15 and curing the same. The conductive resin paste is applied onto the carbon layer 15 by a dipping method or a brush painting method. The dipping method is desirable because it is easy and good in workability.

In the dipping method, first, the capacitor element 10 is dipped in the conductive resin paste filled in a container in such a manner that the embedded lead wire 12a is upside and the lead surface of the embedded lead wire 12a is not dipped. Then, the capacitor element 10 is lifted up so that conductive resin paste is adhered to the surface except for the lead surface of the embedded lead wire 12a. Next, the capacitor element 10 is heated at high temperature so that the conductive resin paste is cured to form the conductive solid layer 16. The carbon layer 15 and the conductive solid layer 16 constitute the cathode of the solid electrolytic capacitor 1.

The surface of the conductive solid layer 16 of the capacitor element 10 is adhered to a lead frame 17 forming a cathode terminal with adhesive such as conductive resin paste or the like (not shown). In addition, the embedded lead wire 12a is welded to a lead frame 11 forming a anode terminal Then, after covering with sheathing material 3 such as epoxy resin or the like in such a manner that the lead frames 11 and 17 are partially exposed, an aging process is performed. Thus, the solid electrolytic capacitor 1 is obtained.

The conductive resin paste forming the conductive solid layer 16 of this embodiment contains nickel powder, silver powder, binder resin, solvent, and addition agent. It is preferred that a metal element component constituted of the nickel powder and the silver powder is contained in the conductive resin paste at 30 to 90 weight percent. If the metal component in the conductive resin paste is less than 30 weight percent, electric contact among metal particles is bad and hence conductivity is deteriorated so that the ESR of the solid electrolytic capacitor 1 is increased. If the metal component in the conductive resin paste is more than 90 weight percent, it is difficult to make paste of the conductive resin paste so that workability in applying the paste becomes bad. Further, adhesion with the carbon layer 15 becomes weak so that the ESR is increased.

In addition, because the metal element component in the conductive resin paste remains even after cured, the weight ratio of nickel to silver in the conductive resin paste is the same as the weight ratio of nickel to silver in the conductive solid layer 16. The weight ratio of nickel to silver in the conductive solid layer 16 of this embodiment is 3 to 30%. Thus, it is possible that leakage current of the solid electrolytic capacitor 1 is small so that the initial ESR can be low. In addition, it is possible to suppress an increase of the ESR by suppressing sulfuration of silver, which can occur when the solid electrolytic capacitor 1 is mounted with soldering by reflow or after long year use.

If the weight ratio of nickel to silver in the conductive solid layer 16 is lower than 3%, the effect of suppressing deterioration of ESR of the solid electrolytic capacitor 1 after long year use is lowered. If the weight ratio of nickel to silver in the conductive solid layer 16 is higher than 30%, the initial value of ESR is increased rather than the effect of suppressing an increase of ESR after long year use. The reason of this is considered to be that the specific resistance of nickel is $6.9 \times 10^{-6}$ $\Omega \cdot cm$ and is larger than the specific resistance of silver that is $1.62 \times 10^{-6}$ $\Omega \cdot cm$.

In particular, if a weight ratio of nickel to silver in the conductive solid layer 16 is set to be 15 to 30%, sulfuration of silver after long year use can be suppressed more so that the increase of ESR can be suppressed more.

The nickel and silver contained in the conductive resin paste can be prepared as one type of flaky, substantially spherical, or fibrous powder, or as a mixture of two types of them. Because the flaky powder sinks slowly in the conductive resin paste, composition bias of the conductive solid layer 16 can be reduced. In addition, because contact area among particles is large, the ESR of the solid electrolytic capacitor 1 can be reduced. Because the substantially spherical powder has small surface area, a chemical change caused by an external factor can be reduced so that characteristic of the solid electrolytic capacitor 1 can be stable.

In addition, it is preferred that particle diameters of nickel and silver powders should be 0.1 to 20 μm. If the particle diameter is smaller than 0.1 μm, a ratio of interparticle having a contact resistance in a conductive path of the conductive solid layer 16 increases, and hence the ESR of the solid electrolytic capacitor 1 is increased.

The binder resin in the conductive resin paste is not limited in particular. Epoxy resin, phenol resin, polyester resin, acrylic resin, polyimide resin, polybutadiene resin, polyamide resin, and the like can be used. From viewpoint of heat resistance, it is preferred to use thermosetting resin. One type may be used alone. Tow or more types may be used as a mixture. In particular, epoxy resin and phenol resin are more preferred because they have good adhesion so that low ESR can be obtained. Further, because they also have good heat resistance, characteristic of the solid electrolytic capacitor 1 becomes stable, and hence they are more preferred.

As the solvent in the conductive resin paste, there is used one type of cellosolve, butyl cellosolve, ethylcarbitol, butylcarbitol, carbitol acetate, alkyl acetate, aromatic hydrocarbon solvent, and the like, or a mixture of two or more types of them.

As the addition agent in the conductive resin paste, there are used curing agent, accelerator, dispersing agent, silane coupling agent, antifoaming agent, corrosion inhibitor, viscosity modifier, antioxidant, fire retardant, filler, pigments, surface active agent, antistatic agent, thixotropic agent for giving thixotropy, and the like.

It is preferred that the conductive resin paste should have a viscosity of 1 to 50 Pa·s. If the viscosity is lower than 1 Pa·s, adhesive amount to the capacitor element 10 becomes small so that the ESR is increased. If the viscosity is larger than 50 Pa·s, the adhesive amount to the capacitor element 10 becomes excessively large so that the conductive solid layer 16 becomes thick, which becomes an obstacle to downsizing of the solid electrolytic capacitor 1.

The temperature when applying the conductive resin paste by dipping method or brush painting method is not limited in particular, and it may be 5 to 80 degrees Celsius, for example. If the temperature is higher than 80 degrees Celsius, viscosity of the conductive resin paste is lowered, but the pot life of the conductive resin paste is shortened. If the temperature is lower than 5 degrees Celsius, viscosity of the conductive resin paste is increased, and frost or dew is apt to be formed. Therefore, moisture may enter the conductive resin paste. Note that it is more preferred that the temperature of the conductive resin paste when the conductive solid layer 16 is formed should be set to 15 to 35 degrees Celsius.

The capacitor element 10 to which the conductive resin paste is applied is placed in high temperature atmosphere so that the solvent is vaporized and the binder resin is cured. The temperature for curing the conductive resin paste is not limited in particular, but it is preferred to be 60 to 200 degrees Celsius. If the temperature is lower than 60 degrees Celsius, curing time becomes long, and insufficient curing may occur. If the temperature is higher than 200 degrees Celsius, the ESR is apt to increase due to deterioration of the solid electrolytic layer 14, or the leakage current is apt to increase due to damage to the dielectric coating 13. The curing time is not limited in particular, but it is preferred to be 5 to 100 minutes. The curing process may be performed in the air, but is preferably performed in nitrogen gas, in an inert gas, or in a vacuum if necessary, so that deterioration of the conductive solid layer 16 due to oxidation can be further suppressed.

In addition, thickness of the conductive solid layer 16 after cured is determined by viscosity of the conductive resin paste and content of nonvolatile components in the conductive resin paste. It is preferred to set the thickness of the conductive solid layer 16 to be 5 to 100 μm and is more preferred to set to 10 to 50 μm.

According to this embodiment, because the weight ratio of nickel to silver contained in the conductive solid layer 16 is 3 to 30%, it is possible to suppress the sulfuration of silver in the conductive solid layer 16, which can occur in the reflow or after long year use. Thus, the increase of ESR of the solid electrolytic capacitor 1 can be suppressed, so that longer life can be achieved. In addition, because the heat treatment for eliminating the sulfur element component is not necessary, the manufacturing man-hour can be reduced, and an increase of leakage current or initial ESR can be prevented. In addition, a using amount of silver as expensive precious metal can be reduced, and hence cost of the solid electrolytic capacitor 1 can be reduced. Further, a facility for the conventional conductive resin paste containing no nickel can be used as it is. Therefore, a new manufacturing facility is not necessary, and hence additional facility cost does not occur.

In addition, because the weight ratio of nickel to silver of the conductive solid layer 16 is set to 15% or higher, the increase of ESR after long year use can be further suppressed.

In addition, the sulfuration of silver contained in the conductive solid layer 16 can be suppressed in the case where the solid electrolytic layer 14 contains the sulfur compound. Therefore, the effect of preventing the increase of ESR is larger.

In addition, in the case where the dopant contained in the conductive polymer forming the solid electrolytic layer 14 is a compound containing the sulfur element, because the sulfuration of silver contained in the conductive solid layer 16 can be suppressed, the effect of preventing the increase of ESR is larger.

In addition, in the case where the conductive polymer forming the solid electrolytic layer 14 contains polythiophene or a derivative thereof, because the sulfur compound is contained, the sulfuration of silver contained in the conductive solid layer 16 can be suppressed. Therefore, the effect of preventing the increase of ESR is larger.

In addition, because the carbon layer 15 is disposed between the solid electrolytic layer 14 and the conductive solid layer 16, adhesive power of the conductive solid layer 16 can be enhanced. Note that if the adhesive power between the solid electrolytic layer 14 and the conductive solid layer 16 is sufficiently large, the carbon layer 15 can be omitted.

Because the sulfur compound exists in the air and enters the capacitor element 10, this embodiment is effective also to the solid electrolytic capacitor in which the solid electrolytic layer 14 is made of manganese dioxide.

Example 1

Hereinafter, an example of the solid electrolytic capacitor 1 is described. In the solid electrolytic capacitor 1 of Example 1, the anode member 12 was made of a sinter of niobium having dimensions of 4.2 mm×3.4 mm×1.6 mm. In this case, the embedded lead wire 12a made of a sinter of niobium was formed simultaneously on one end of the anode member 12. Next, the anode member 12 was dipped in phosphoric acid aqueous solution, and a DC voltage of 32 volts was applied so that anodic oxidation (formation) of the anode was performed. Thus, the dielectric coating layer 13 was formed.

Next, a chemical polymerization layer was formed by thiophene monomer and oxidizer on the surface of the dielectric coating layer 13. Further, the capacitor element 10 was dipped in solution in which thiophene monomer and supporting electrolyte were dissolved, and hence the electrode was contacted with the chemical polymerization layer so that electrolytic polymerization was performed. Thus, the solid electrolytic layer 14 was formed. Next, the capacitor element 10 was dipped in the carbon suspension and then was dried so that the carbon layer 15 was formed.

Next, epoxy resin containing addition agent of 10 parts by weight, butylcarbitol of 30 parts by weight, flaky silver powder of 50 parts by weight, spherical nickel powder of 10 parts by weight were mixed and dispersed uniformly using an agitator and a triple roll so that the conductive resin paste was produced. In this case, the weight ratio of nickel to silver in the conductive resin paste (conductive solid layer 16) was 20%.

After smoothing the surface of the conductive resin paste, the capacitor element 10 was dipped in such a manner that the embedded lead wire 12a is upside so that the conductive resin paste was applied onto the surface thereof. Next, the capacitor element 10 was lift up at a constant speed of 8 mm/min, and was cured at 150 degrees Celsius for 30 minutes after wiping off draining of the conductive resin paste.

Next, after attaching the lead frames 11 and 17 to the capacitor element 10, the capacitor element 10 was coated with the sheathing material 3 made of epoxy resin. Then, the solid electrolytic capacitor 1 was formed by a predetermined aging process.

Example 2

In the solid electrolytic capacitor 1 of Example 2, the silver powder of 52 parts by weight was contained in the conductive resin paste forming the conductive solid layer 16, and the nickel powder of 7.8 parts by weight was contained. In this case, the weight ratio of nickel to silver in the conductive resin paste (conductive solid layer 16) was 15%. Other manufacturing conditions were the same as Example 1.

Example 3

In the solid electrolytic capacitor 1 of Example 3, the silver powder of 46 parts by weight was contained in the conductive resin paste forming the conductive solid layer 16, and the nickel powder of 13.8 parts by weight was contained. In this case, the weight ratio of nickel to silver in the conductive resin paste (conductive solid layer 16) was 30%. Other manufacturing conditions were the same as Example 1.

Example 4

In the solid electrolytic capacitor 1 of Example 4, the silver powder of 58 parts by weight was contained in the conductive resin paste forming the conductive solid layer 16, and the nickel powder of 1.7 parts by weight was contained. In this case, the weight ratio of nickel to silver in the conductive resin paste (conductive solid layer 16) was 3%. Other manufacturing conditions were the same as Example 1.

Comparative Example 1

In the solid electrolytic capacitor 1 of Comparative example 1, the silver powder of 60 parts by weight was contained in the conductive resin paste forming the conductive solid layer 16, and the nickel powder was not contained. In this case, the weight ratio of nickel to silver in the conductive resin paste (conductive solid layer 16) was 0%. Other manufacturing conditions were the same as Example 1.

Comparative Example 2

In the solid electrolytic capacitor 1 of Comparative example 2, the silver powder of 40 parts by weight was contained in the conductive resin paste forming the conductive solid layer 16, and the nickel powder of 20 parts by weight was contained. In this case, the weight ratio of nickel to silver in the conductive resin paste (conductive solid layer 16) was 50%. Other manufacturing conditions were the same as Example 1.

ESR characteristics at 100 kHz of the solid electrolytic capacitors of Examples and Comparative examples manufactured as described above were measured at initial time, after soldering heat resistance test, and after endurance test. The results are shown in Table 1 and FIG. 2.

TABLE 1

| | Content in Conductive Resin Paste | | Weight Ratio of Nickel to Silver % | ESR | | |
|---|---|---|---|---|---|---|
| | Silver Parts by Weight | Nickel Parts by Weight | | Initial mΩ | After Soldering Heat Resistance Test mΩ | After Endurance Test mΩ |
| Example 1 | 50 | 10 | 20 | 12.2 | 12.4 | 22.1 |
| Example 2 | 52 | 7.8 | 15 | 12.2 | 12.8 | 22.5 |
| Example 3 | 46 | 13.8 | 30 | 12.5 | 13.0 | 22.5 |
| Example 4 | 58 | 1.7 | 3 | 12.1 | 12.9 | 23.5 |
| Comparative Example 1 | 60 | 0 | 0 | 12.0 | 12.8 | 24.7 |
| Comparative Example 2 | 40 | 20 | 50 | 14.6 | 14.9 | 24.4 |

Here, the soldering heat resistance test was performed by reflow at 250 degrees Celsius for five seconds. The endurance test was performed by applying DC voltage of 6.3 volts at 105 degrees Celsius for 1,000 hours. It is known that a relationship between temperature and life conforms to the Arrhenius equation in the endurance test in which a voltage is applied at high temperature, and this test is performed as a reliability test for estimating life of a capacitor.

Figure 2:
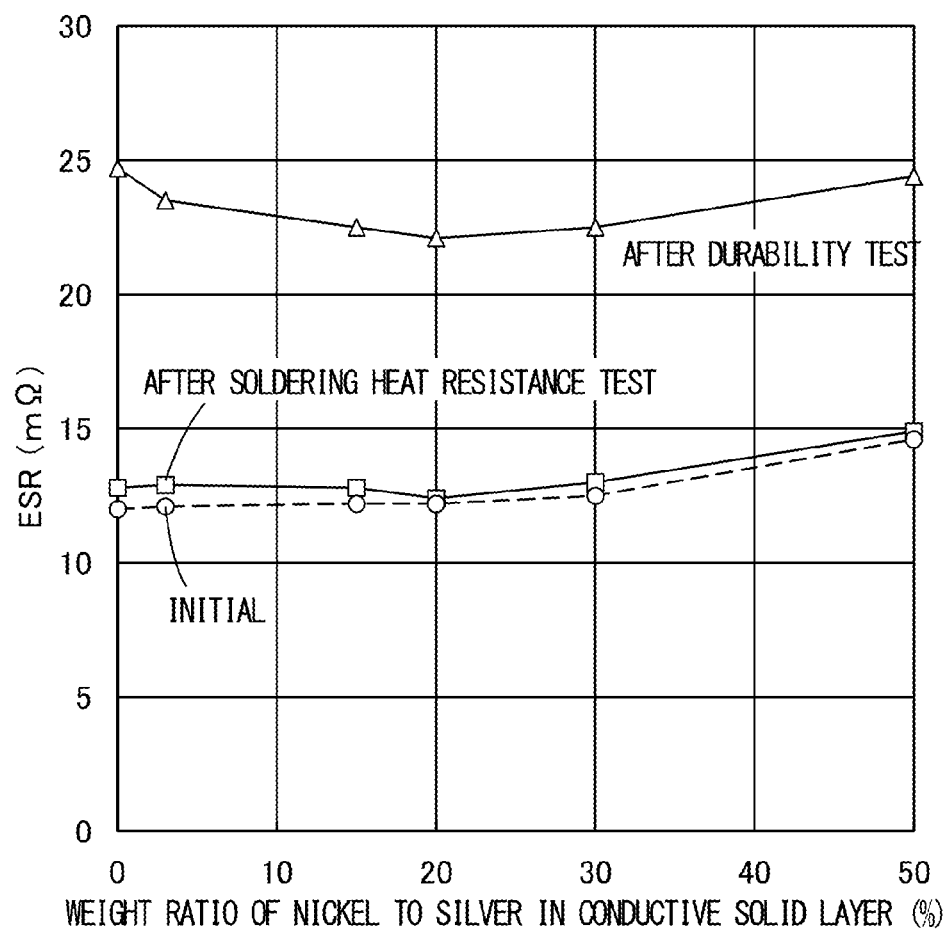
FIG. 2 is a graph illustrating a relationship between a component of a conductive solid layer and ESR of the solid electrolytic capacitor of the embodiment of the present invention.

According to Table 1 and FIG. 2, the initial value of ESR increases gradually along with an increase of the amount of nickel in the conductive solid layer 16. There is little change of the initial ESR while the weight ratio of nickel to silver in the conductive solid layer 16 is in a range of 0 to 30%. When the weight ratio of nickel to silver in the conductive solid layer 16 exceeds 30%, the initial ESR becomes large.

In addition, the ESR after endurance test is small while the weight ratio of nickel to silver in the conductive solid layer 16 is in a range of 3 to 30%. In particular, it is understood that deterioration of ESR is suppressed in a range where the weight ratio of nickel to silver in the conductive solid layer 16 is 15 to 30%. From this result, it is confirmed that an increase of the initial ESR of the solid electrolytic capacitor 1 is suppressed to minimum and deterioration in the endurance test is suppressed so that long life effect can be obtained when the weight ratio of nickel to silver in the conductive resin paste is set to a range of 3 to 30%. The reason of this is considered to be that the sulfuration of silver is suppressed by addition of nickel.

In each example described above, the anode member 12 is made of niobium, but the same effect can be obtained also in the solid electrolytic capacitor 1 in which the anode member is made of tantalum or aluminum so that the sulfuration of silver in the conductive solid layer 16 forming the cathode is suppressed.

The present invention can be applied to a solid electrolytic capacitor having a cathode containing silver.

What is claimed is:

1. A solid electrolytic capacitor comprising:
   an anode member made of a valve action metal;
   a dielectric coating layer formed on a surface of the anode member;
   a solid electrolytic layer formed on the dielectric coating layer; and
   a conductive solid layer covering the solid electrolytic layer, wherein
   the conductive solid layer contains silver, nickel, and binder resin comprising thermosetting resin, and the weight ratio of nickel to silver is set to 3 to 30%.

2. A solid electrolytic capacitor comprising:
   an anode member made of a valve action metal;
   a dielectric coating layer formed on a surface of the anode member;
   a solid electrolytic layer formed on the dielectric coating layer; and
   a conductive solid layer covering the solid electrolytic layer, wherein
   the conductive solid layer contains silver, nickel, and binder resin, and the weight ratio of nickel to silver is set to 15% to 30%.

3. The solid electrolytic capacitor according to claim 1, wherein the solid electrolytic layer contains sulfur element.

4. The solid electrolytic capacitor according to claim 2, wherein the solid electrolytic layer contains sulfur element.

5. The solid electrolytic capacitor according to claim 3, wherein the solid electrolytic layer is made of conductive polymer, and dopant contained in the conductive polymer is compound containing sulfur element.

6. The solid electrolytic capacitor according to claim 4, wherein the solid electrolytic layer is made of conductive polymer, and dopant contained in the conductive polymer is compound containing sulfur element.

7. The solid electrolytic capacitor according to claim 5, wherein the conductive polymer contains polythiophene or a derivative thereof.

8. The solid electrolytic capacitor according to claim 6, wherein the conductive polymer contains polythiophene or a derivative thereof.

9. The solid electrolytic capacitor according to claim 1, wherein a carbon layer is disposed between the solid electrolytic layer and the conductive solid layer.

10. The solid electrolytic capacitor according to claim 2, wherein a carbon layer is disposed between the solid electrolytic layer and the conductive solid layer.

11. The solid electrolytic capacitor according to claim 3, wherein a carbon layer is disposed between the solid electrolytic layer and the conductive solid layer.

12. The solid electrolytic capacitor according to claim 4, wherein a carbon layer is disposed between the solid electrolytic layer and the conductive solid layer.

13. The solid electrolytic capacitor according to claim 5, wherein a carbon layer is disposed between the solid electrolytic layer and the conductive solid layer.

14. The solid electrolytic capacitor according to claim 6, wherein a carbon layer is disposed between the solid electrolytic layer and the conductive solid layer.

15. The solid electrolytic capacitor according to claim 7, wherein a carbon layer is disposed between the solid electrolytic layer and the conductive solid layer.

16. The solid electrolytic capacitor according to claim 8, wherein a carbon layer is disposed between the solid electrolytic layer and the conductive solid layer.

* * * * *